Figure 1:
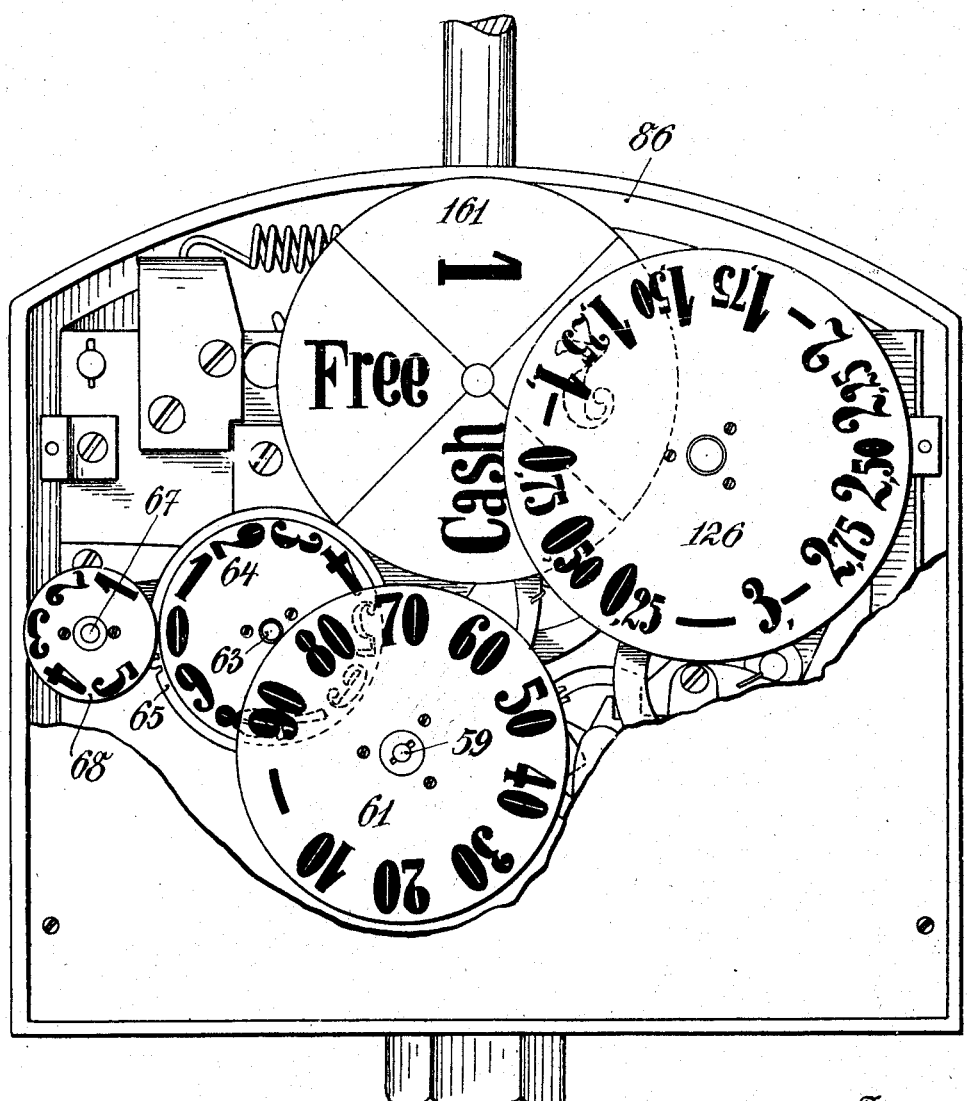

H. ARON & O. RUNGE.
TAXIMETER.
APPLICATION FILED MAR. 30, 1908.

950,461.

Patented Feb. 22, 1910.
12 SHEETS—SHEET 1.

Witnesses
E. Baker.
S. M. McColl.

Inventors
H. Aron
and O. Runge
By H. B. Willson & Co.
Attorneys.

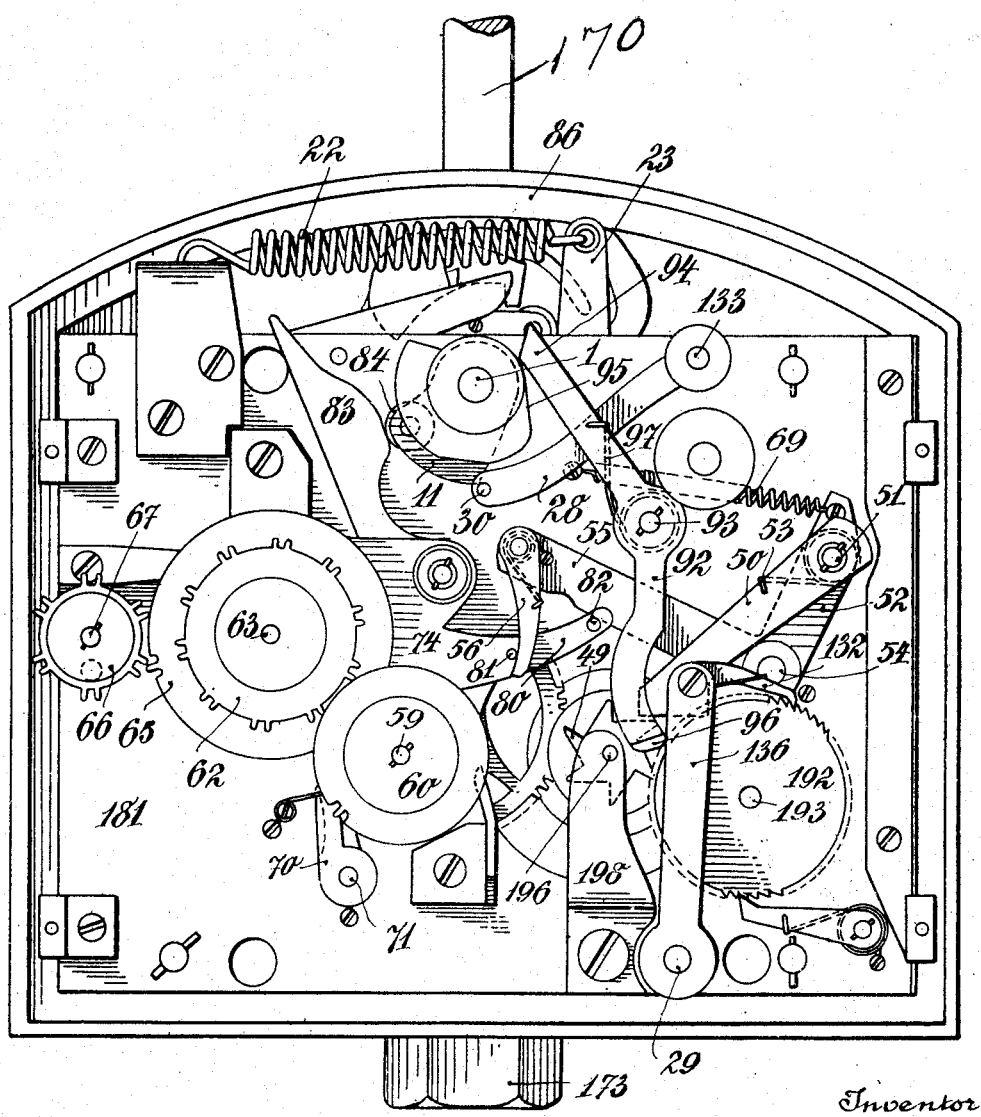

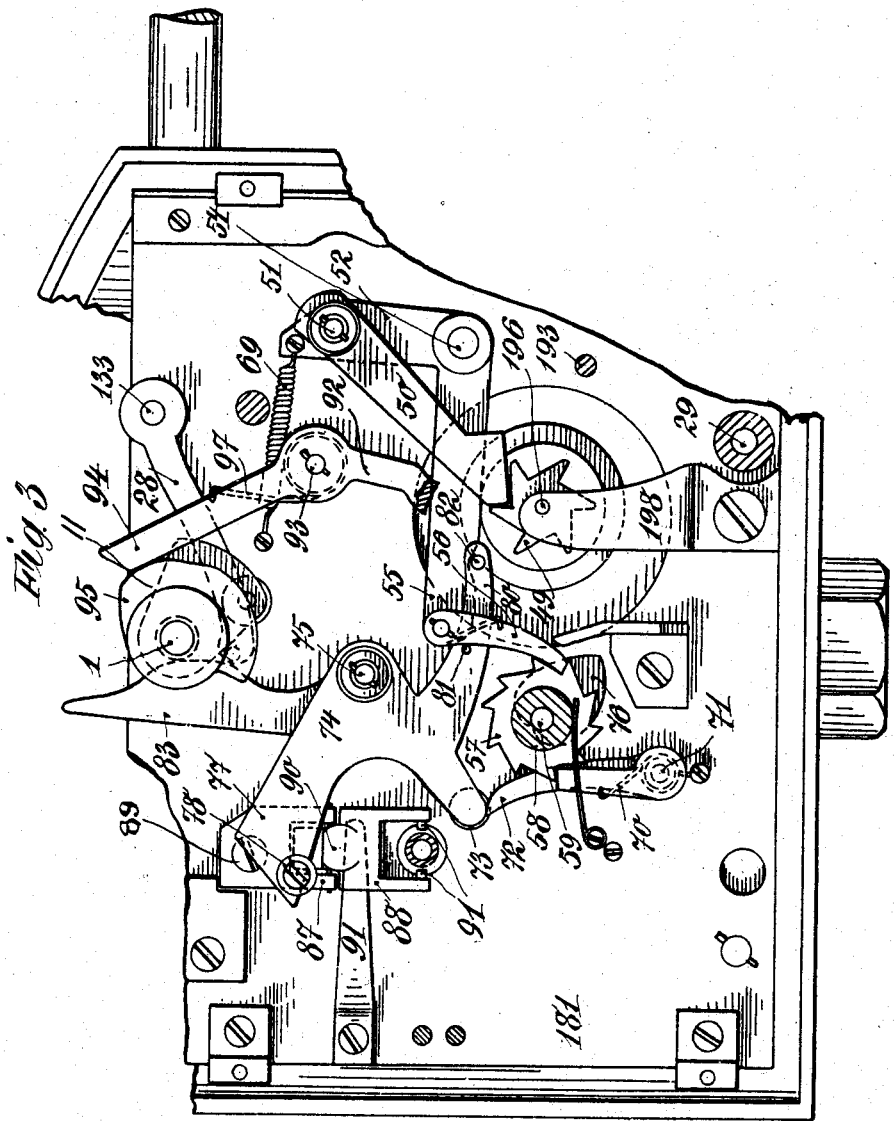

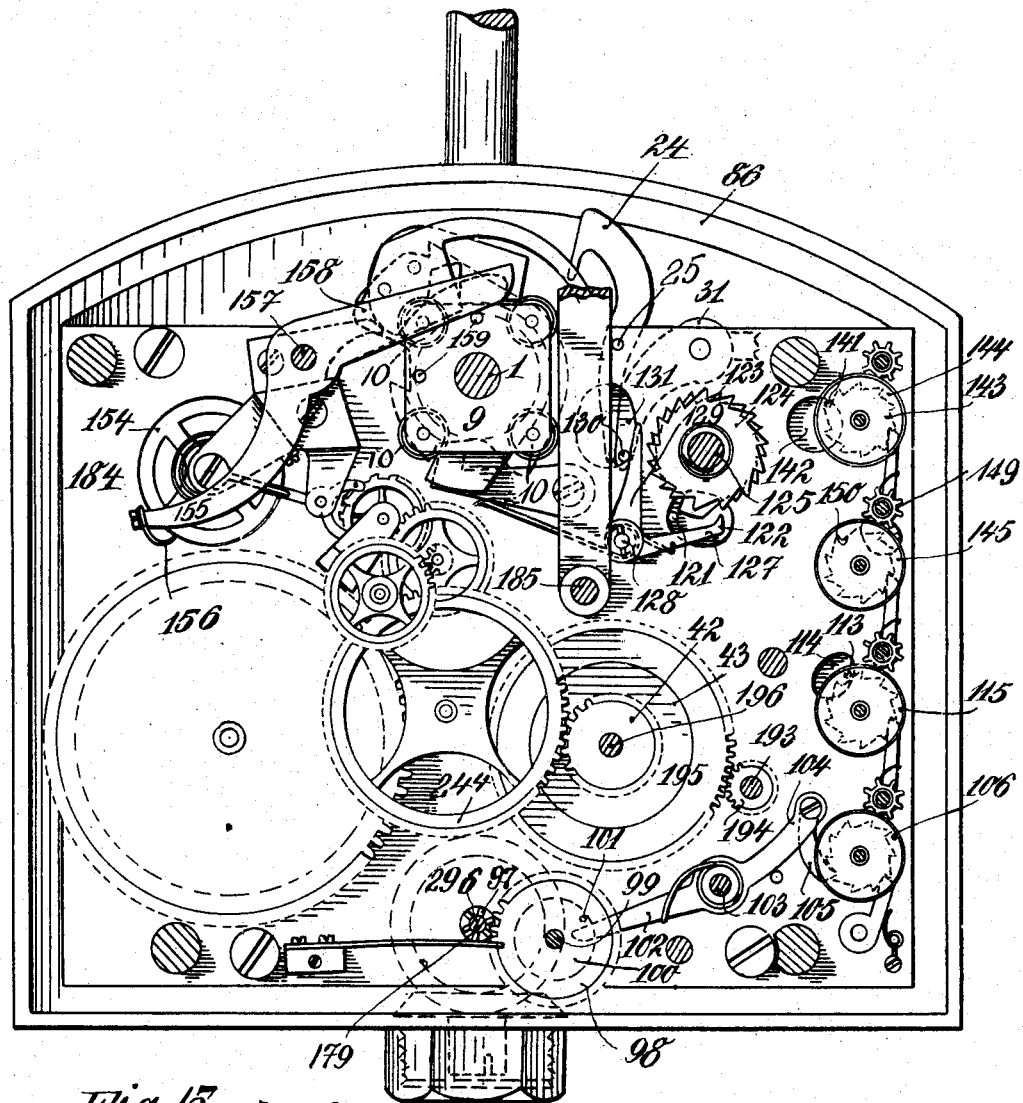
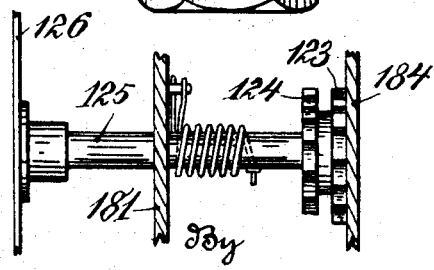

H. ARON & O. RUNGE.
TAXIMETER.
APPLICATION FILED MAR. 30, 1908.

950,461.

Patented Feb. 22, 1910.
12 SHEETS—SHEET 6.

Witnesses
E. Crocker
S. W. McColl

Inventors
H. Aron
and O. Runge
By H. B. Willson &Co.
Attorneys

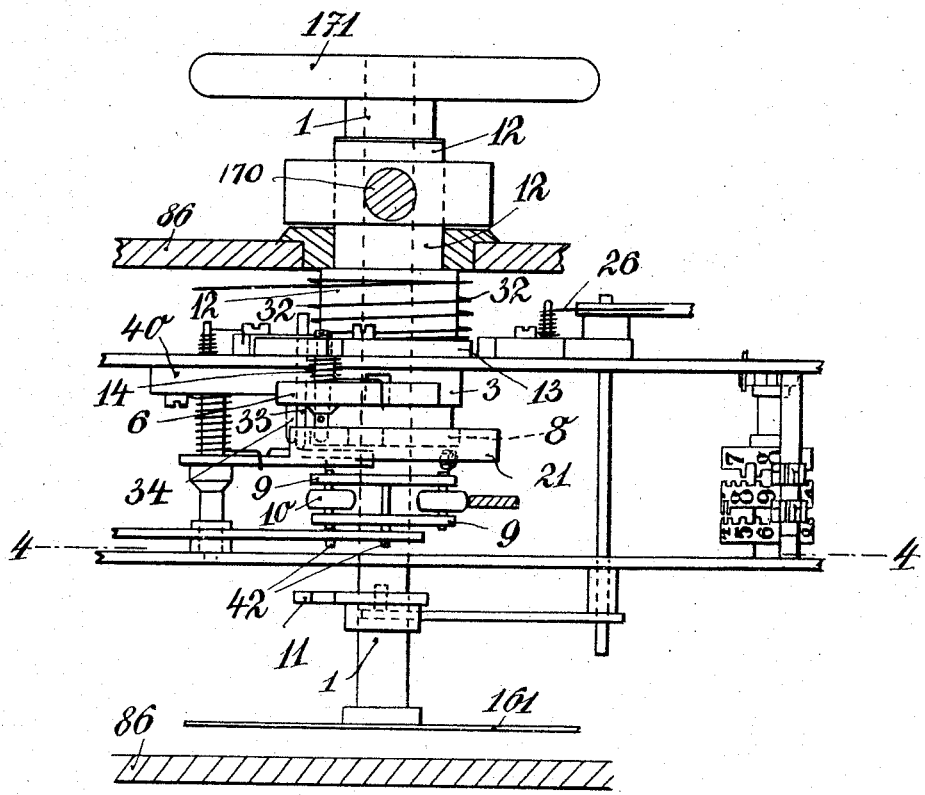

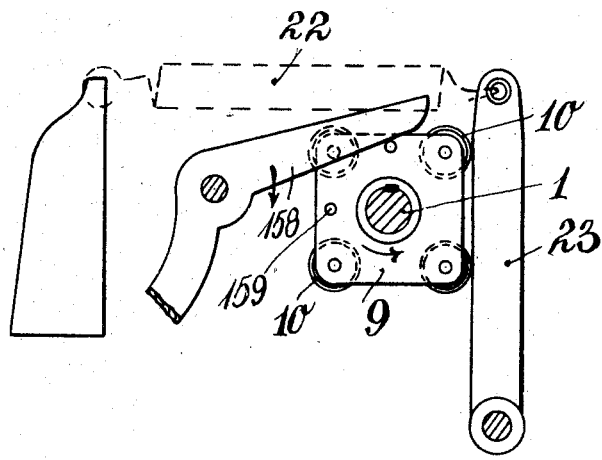
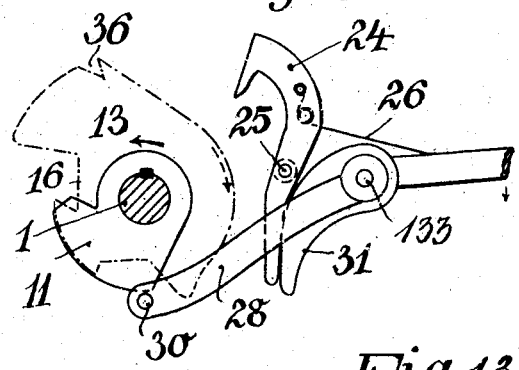
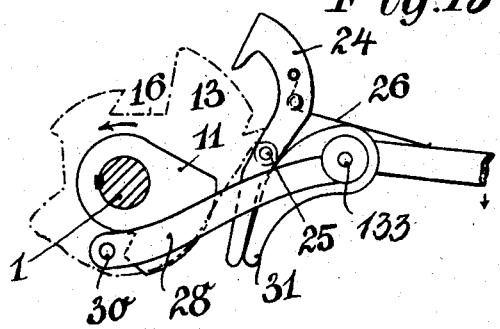

H. ARON & O. RUNGE.
TAXIMETER.
APPLICATION FILED MAR. 30, 1908.
950,461.
Patented Feb. 22, 1910.
12 SHEETS—SHEET 10.
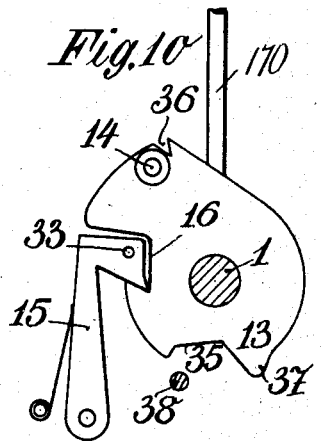
Fig.10
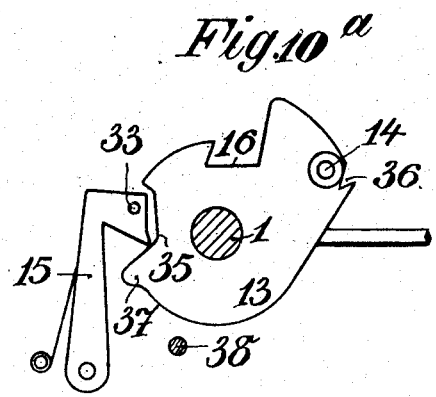
Fig.10ᵃ
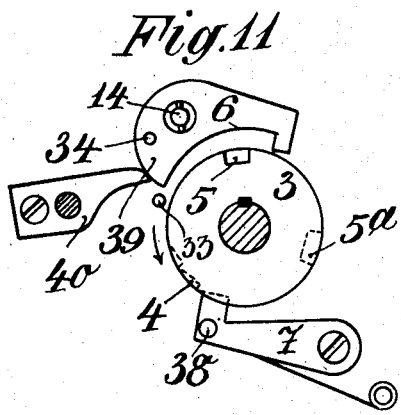
Fig.11
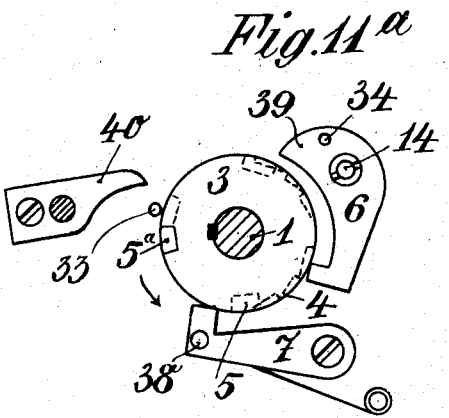
Fig.11ᵃ
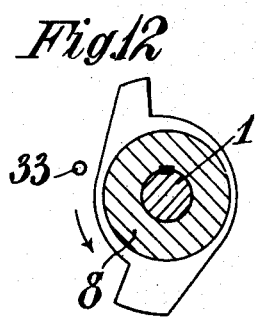
Fig.12
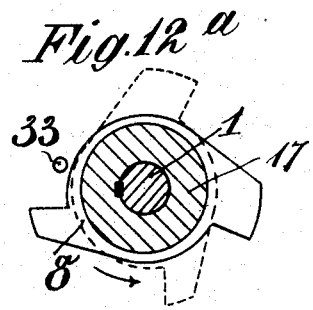
Fig.12ᵃ
Witnesses.
C. Crocker.
S. M. McColl
Inventors
H. Aron
and O. Runge
By H. B. Willson & Co.
Attorneys

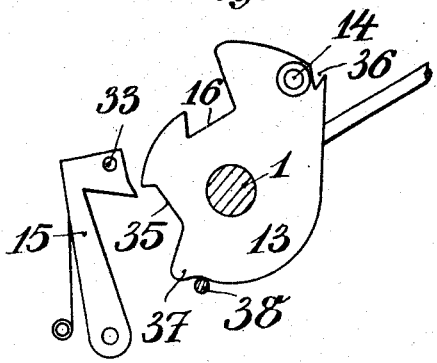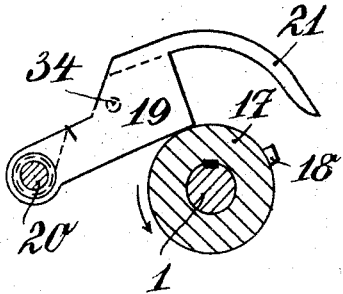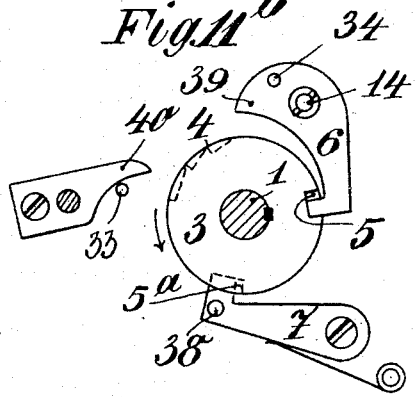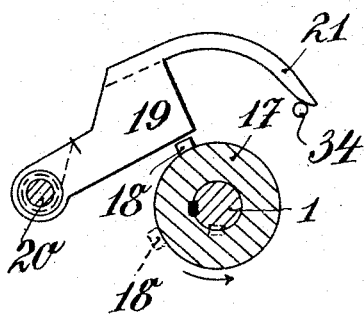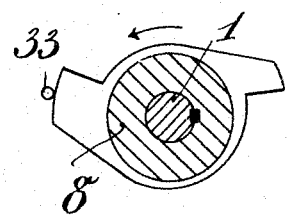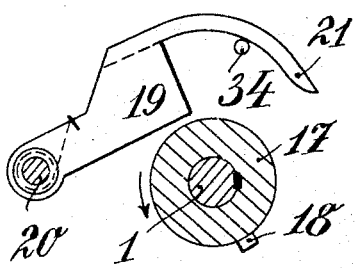

H. ARON & O. RUNGE.
TAXIMETER.
APPLICATION FILED MAR. 30, 1908.
950,461.
Patented Feb. 22, 1910.
12 SHEETS—SHEET 12.
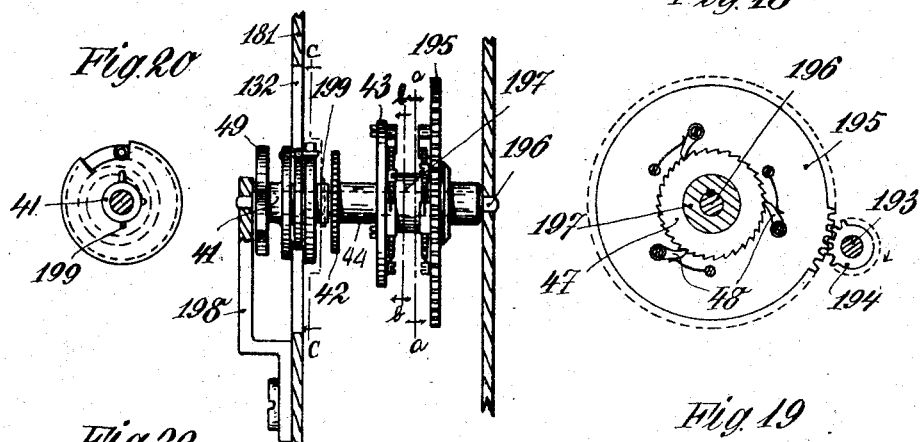
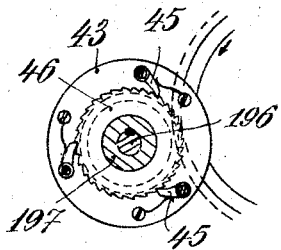
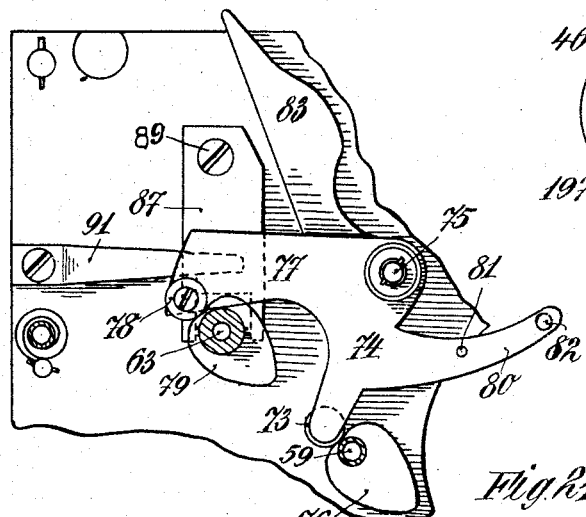
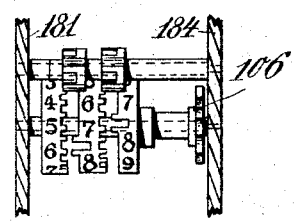
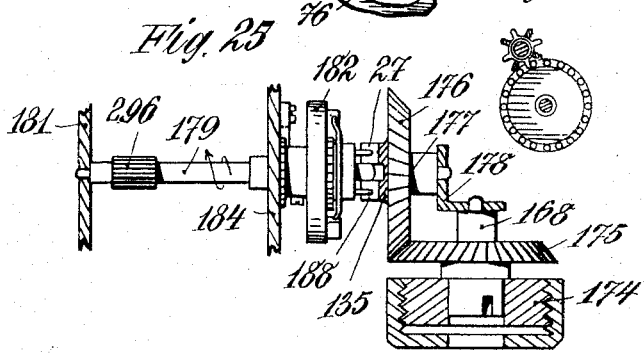
Witnesses
E. Crocker
S. M. McColl
Inventors
H. Aron
and O. Runge
By H. B. Willson &co.
Attorneys

UNITED STATES PATENT OFFICE.

HERMANN ARON AND OSKAR RUNGE, OF CHARLOTTENBURG, GERMANY; SAID RUNGE ASSIGNOR TO SAID ARON.

TAXIMETER.

950,461.  Specification of Letters Patent.  Patented Feb. 22, 1910.

Application filed March 30, 1908. Serial No. 424,169.

*To all whom it may concern:*

Be it known that we, HERMANN ARON, Ph. D., electrician, and OSKAR RUNGE, foreman, citizens of Germany, subjects of the King of Prussia and Emperor of Germany, both residing at Charlottenburg, near Berlin, in the Kingdom of Prussia and Empire of Germany, have invented new and useful Improvements in Taximeters, of which the following is a specification.

This invention relates to taximeters of that kind in which the adjustment into the different conditions of service is effected by a special adjusting device and in which a flag sign is lowered when setting the adjusting device into operative position. In taximeters heretofore known the flag sign and the adjusting shaft of the adjusting device have such a relation to each other that the flag sign is either positively lowered, when the taximeter is put into service by means of the adjusting device, or, owing to its being rigidly connected with the adjusting shaft, constitutes in itself a means for adjusting the taximeter.

The object of this invention is to provide a taximeter of this kind in which the flag sign is loosely mounted on the adjusting shaft of the adjusting device and is maintained upright in the "free" position, indicating that the cab is free for hire, against the action of a spring or its preponderating weight by a locking device which is released when setting the adjusting device into operative position. According to the invention the flag sign is only put into connection with the adjusting shaft if the adjusting device is set into the so-called "cash" position. Thus in the present invention the flag sign is, on the one hand, automatically lowered on setting the taximeter into operation, and, on the other hand, coupled to the adjusting shaft and positively raised on setting the adjusting device to "Cash."

Another object of the invention is to automatically lock the adjusting shaft after its coupling to the flag sign, that is to say in the "cash" position. This is attained by a locking device which only releases the adjusting shaft, if the flag sign is raised into the "free" position.

Another object of the invention is to provide a taximeter in which the adding up drums or totalizing devices are so arranged in relation to the fare indicating and tariff indicating dials as to be always visible laterally of the car through a sight opening in the side wall of the casing, which is preferably arranged at right angles to the wall provided with the sight opening for exposing the fare indicating and the tariff indicating dials in front of the passenger. For this purpose, the totalizing indications are preferably provided on drums, the shafts of which are mounted in one and the same plane, one above the other and parallel to the adjusting shaft as well as to the shafts bearing the fare indicating and tariff indicating dials.

A further object of the invention is to provide a taximeter in which the register wheels or drums of the adding-up mechanisms may be easily read from the side of the cab without being obliged to turn over or open the casing of the taximeter, this object being obtained by arranging all drums together with their mechanisms jointly at one and the same wall and laterally in the taximeter casing so as to look to the outward side or to the interior of the cab.

The above and other objects, which will appear as the nature of this invention are accomplished by the arrangement, construction and combination of parts, as hereinafter described and illustrated in the accompanying drawings in which—

Figure 5:
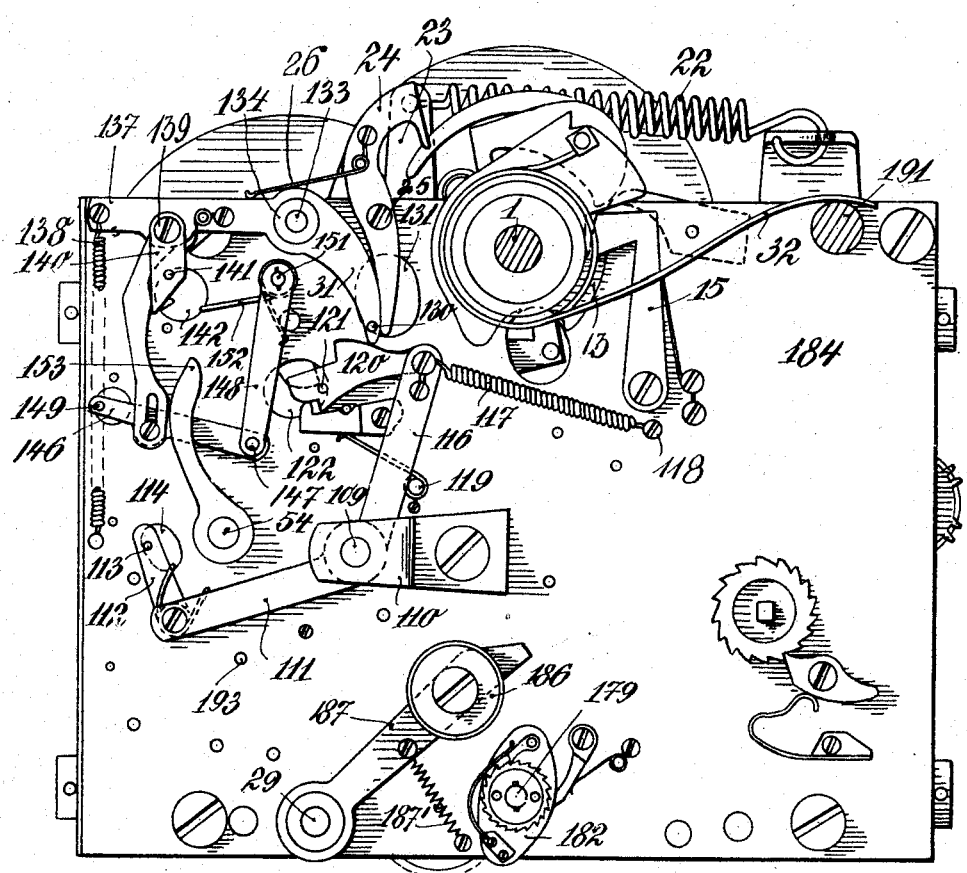
Figure 6:
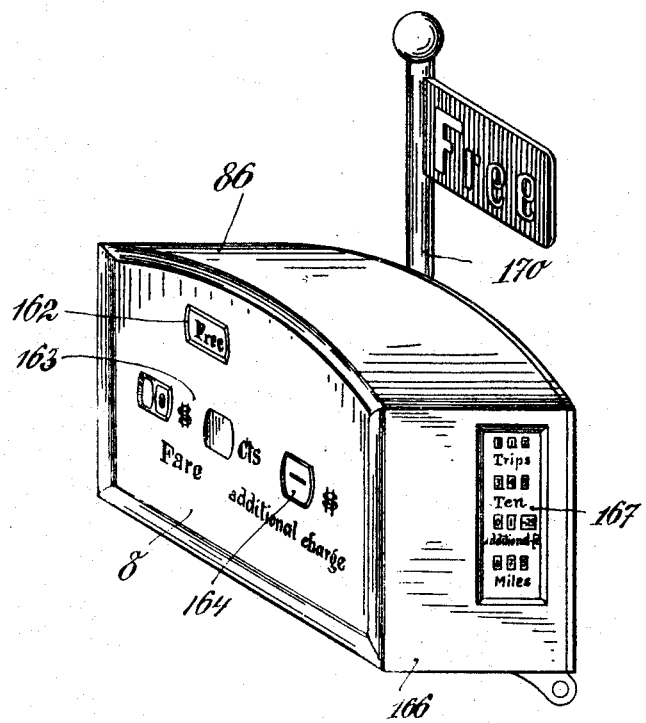
Figure 7:
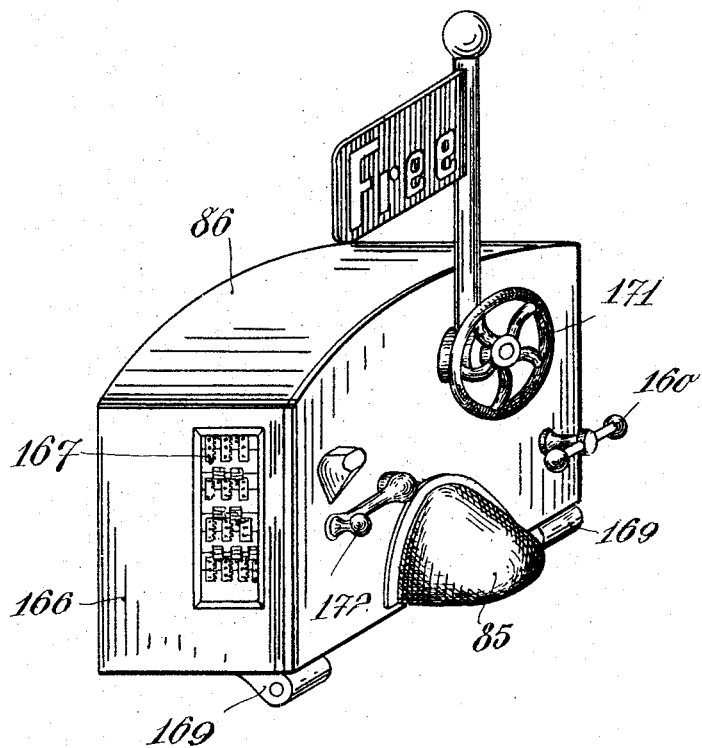

Figure 1 is a front view of the taximeter with its face partially removed, showing the counting or indicating dials; Fig. 2 is a similar view with the face and the dials removed; Fig. 3 is a view similar to Fig. 2 with parts broken away and showing the mechanism in a different position of its parts; Fig. 4 is a sectional view corresponding to line 4—4 of Fig. 8; Fig. 5 is a view from the rear side with the casing removed; Fig. 6 is a perspective view of the taximeter showing the front wall; Fig. 7 is a similar view showing the rear wall of the taximeter; Fig. 8 is a top view with parts broken away and other parts omitted for the sake of clearness; Fig. 9 is a detail front view of a square frame device for securing the different positions of the adjusting device; Figs. 10, 11 and 12 are detail front views of the means for locking the adjusting device; Figs. 10$^a$, 11$^a$ and 12$^a$ respectively, are similar views showing the parts in a different position; Figs. 10$^b$, 11$^b$, and 12$^b$ are similar views showing the parts in a third position; Figs.

13 and 13ᵃ show in two different positions a device for preventing the flag sign from being raised; Figs. 14, 14ᵃ and 14ᵇ show a detail view of a locking device for preventing the adjusting device from being turned unless the flag sign has been lowered; Fig. 15 shows the shaft of the additional fare indicating dial in plan view; Fig. 16 shows the unit dollar dial with its shaft in plan view; Fig. 17 is a detail side elevation of the mechanism for transmitting the movement of both the chronometer and of the cyclometer independently of the counting mechanisms. Figs. 18, 19 and 20 are sectional views taken on the lines a—a, b—b, and c—c of Fig. 17 respectively, and viewed in the directions of the respective arrows; Fig. 21 shows the shaft of the said transmitting mechanism in detail; Fig. 22 is a detail front view showing the mechanism for resetting the counting or indicating dials to zero; Figs. 23 and 24 show one of the adding-up mechanisms in side elevation and sectional view respectively, and Fig. 25 is a detail view of the cyclometer mechanism transmitting the movement from the vehicle wheels.

Referring now more particularly to Figs. 6 and 7 of the drawings, 86 is the casing inclosing the whole taximeter mechanism and having a front wall 8 provided with view openings 162, 163 and 164 to permit the dials showing the service conditions of the taximeter, the fare and the additional charge respectively to be read. Another view opening 167 is arranged to expose the drums of the adding-up mechanisms registering the totals of the trips, of the fares and additional fees and of the miles traveled by the vehicle. This view opening is arranged in the side wall 166 of the casing. From the back or the wall facing the driver there projects the hand wheel 171 of the adjusting device, the handle 160 for winding up the clock work and the hand lever 172 for adjusting the additional charge dial. 85 is a cap covering the means for connecting the flexible shaft driven from the vehicle wheel to the cyclometer mechanism and 169 are lugs for securing the taximeter casing to the cab, so as to have its side wall 166 looking to the outward side of the cab or to the rear side. This offers the advantage that when the owner wishes to inspect his cab he needs only to step up to the same, where he can easily read the totals of the fares collected and of the other indications registered by the taximeter. By this arrangement the necessity of turning over or opening the taximeter casing is avoided. Consequently, the cab may be controlled by the owner or any one else in an unnoticeable and quick manner. This arrangement is independent of the system of the meter itself, the different parts of the latter only are to be placed in such a manner that the adding-up mechanisms may be jointly located as described above.

The taximeter illustrated is capable of being operated by either a clock mechanism or by the travel of the cab to which it is attached and is so constructed as to be operated by the one moving the faster, that is to say: when the cab is standing or when moving at a slow speed, the clock will operate the registers, and when the cab is moving at a higher speed the cab will operate the registers through the medium of a cyclometer which may receive its impulse by means of a flexible shaft from a wheel of the cab. This flexible shaft (not shown in the drawings) engages a short shaft 168 journaled at 174, see Fig. 25, in the lower part of the casing and having secured to it a conical or bevel wheel 175 meshing with a similar wheel 176 secured to a shaft 177 journaled together with the other end of the shaft 168 in a bracket 178 fixed to the casing. In alinement with shaft 177 there is a shaft 179 rotatably mounted in and extending between the main frame plates 181 and 184 of the taximeter and having attached to it at its rear end two pins 188 engaging a slot 27 provided in the hub 135 projecting inwardly from the wheel 176. Upon shaft 179 there is keyed or otherwise fixed a cam disk 182 adapted to engage a friction roller 186 mounted upon a lever 187 actuated by a spring 187′, as may be seen in Fig. 5. This lever 187 is fixed to a rocking shaft 29 journaled in the plates 181, 184 and projecting from the front plate 181, Fig. 2. Upon shaft 29 there is secured an arm 136 which carries at its free end a spring-pawl 132 adapted to engage a ratchet wheel 192 mounted on a shaft 193 journaled in the plates 181, 184.

92 is a lever pivoted at 93 to plate 181 and having its lower end 96 normally held in engagement with the arm 136 by means of a spring 97 engaging the other arm 94 of said lever so as to force it toward a cam 95 fixed to the adjusting shaft 1, hereinafter referred to more particularly. By the rotation of this shaft 1, the lever 92 may be caused to release the arm 136 and allow its being swung by the rocking shaft 29.

Shaft 193 has a pinion 194, Figs. 4 and 18, secured to it which meshes with a spur wheel 195 loosely mounted upon a shaft 196 extending through an aperture 132 of plate 181 and journaled on this side in a bracket 198 secured to said plate, Fig. 17. Adjacent to wheel 195 a sleeve 197 is fixed to shaft 196 by means of a key, Figs. 18, 19 and 21. A second sleeve 41 is secured to the opposite end of shaft 196 by means of a transverse pin 199. Between these two sleeves there is a third sleeve 44 loosely slipped over shaft 196. This sleeve 44 has secured to it a spur wheel 42 and a disk 43, the former meshing with the gearing of the clock work or chronometer mechanism of the taximeter, while disk 43 carries three spring-pawls 45 adapted to engage a ratchet wheel 46 fixed to sleeve 197. This sleeve has also secured to it a ratchet wheel 47 adjacent to the spur wheel 195 which spur wheel supports three spring pawls 48, adapted to engage said ratchet wheel 47.

The mechanism hereinbefore described has for its purpose to allow both the driving from the cyclometer mechanism and that from the clock work to be independently transmitted to the counting and adding-up mechanisms which now will be described. The motion for these mechanisms is taken from sleeve 41 this latter being provided for this purpose with a star-wheel 49 which is adapted to actuate an arm 50, Fig. 2, pivoted at 51 to a lever 52 and being held by a spring 53 attached to said lever in the range of said star-wheel. Lever 52 forms one arm of a bell crank lever fixed to a rocking shaft 54 and actuated by a coil spring 69 one end of which engages the free end of said arm 52, the other end being secured to the frame plate 181. The other arm 55 of said bell-crank lever has pivoted adjacent to its free end a spring-pawl 56 adapted to engage a ratchet wheel 57, Fig. 3, fixed to a sleeve 58. This sleeve is loosely mounted on a pivot-pin 59 which projects from the front plate 181 and is rigidly secured thereto. Upon sleeve 58 there is also fixed the single-tooth wheel 60 and the dial 61, Figs. 1 and 2, for indicating the cents of the fare to be paid. Wheel 60 meshes with a wheel 62 mounted on a pivot 63, and also mounted on said pivot 63 is a carrying dial 64 for indicating the dollar-units and a single-tooth wheel 65 which latter meshes with a corresponding wheel 66 rotatable on pivot 67. Wheel 66 is connected to a dial 68 indicating the tens of dollars. A spring pawl 70 is pivoted at 71 to the plate 181, and engages the teeth of the ratchet-wheel 57, and prevents it from being turned in the reverse direction. See Fig. 3. Pawl 70 has connected to it a finger 72 adapted to be engaged by a roller 73 mounted on a bell-crank lever 74 which is pivoted at 75 to the frame plate 181. Roller 73 is also adapted to engage a cam 76, Figs. 3 and 22, when lever 74 is depressed, as hereinafter described, for the purpose of resetting to zero the fare indicating dial 61 connected to said cam. The other arm 77 of lever 74 carries a roller 78 adapted to engage a cam 79 rigidly connected to the wheels 62 and 65 and dial 64 of the fare indicating mechanism. The bell-crank lever 74 has a finger 80 projecting from it, and provided with two pins 81 and 82. Pin 81 is in the range of pawl 56, Figs. 2 and 3, to enable it to release said pawl from engagement with ratchet-wheel 57 upon the finger 80 being raised, while pin 82 engages the arm 55 of bell-crank lever 52. Lever 74 will be operated by means of an arm 83 secured thereto and projecting into the path of a friction roller 84 mounted on a disk 11 of the shaft 1 of the tariff adjusting device, hereinafter to be described. Below the arm 77 of lever 74 there is fixed to plate 181 a bracket 87, Figs. 3, 16 and 22, having a plate 88 connected thereto by means of a pin 89 on which it is revoluble. This may be effected by means of the arm 77 which when swung over said plate 181 will engage a friction face 90 provided on said plate and thus force down said plate against the action of a spring 91 which tends to raise it. The free end of the plate 88 is recessed to form two side portions having inwardly projecting pins 291. These pins 291 engage an annular groove formed in the sleeve 200 of dial 64, see Fig. 16. Upon lowering said sleeve 200 by bringing arm 77 into engagement with plate 88 wheels 62 and 65 may be thrown out of gear with wheels 60 and 66 respectively, so as to allow the corresponding dials 68 and 61 respectively, to return to their zero position. This may take place, as far as dial 68 is concerned automatically by means of a spiral spring acting upon it while the dials 61 and 64 are reset through the medium of the cams 76 and 79 respectively, as will be hereinafter described.

Referring again to the shaft 179 of the cyclometer mechanism, as represented in detail in Fig. 25, this shaft has secured to it a pinion 296 see Fig. 4 meshing with a toothed wheel 98 fixed to shaft 99 which is mounted between plates 181 and 184 similarly to shaft 179 and adjacent to it. Upon shaft 99 there is secured a disk 100 having an axially projecting pin 101 adapted to engage an arm 102 of a double armed spring actuated lever pivoted at 103 to plate 181. The other arm 104 of this lever has a spring pawl 105 pivoted to it which is adapted to engage a ratchet wheel 106. By the medium of this ratchet wheel 106 motion is imparted to the lowermost of the adding-up mechanisms situated adjacent the side wall 166 of the taximeter casing. This lowermost mechanism, Fig. 23, is for indicating the totals of the miles traveled by the cab to which the taximeter is attached. Above this mechanism there is located a second mechanism 108 for adding-up the amounts of additional charges. This mechanism receives its motion from a rocking shaft 109, Fig. 5, mounted in a bracket 110 of the rear plate 184 and projecting on the outside of the rear wall of the taximeter casing, where it is provided with the hand lever 172, Fig. 7. Upon the shaft 109 there is rigidly mounted a bell-crank lever 111, the lower arm of which has pivoted to it a spring actuated lever 112 as will be seen from Figs. 4 and 5. A pin 113 carried by lever 112 projects through an aperture 114 of plate 184, and is adapted to engage a ratchet wheel 115 of said additional fare register mechanism to operate this mechanism upon the shaft 109 being rocked by means of the hand lever 172. To the free end of the other arm 116 of bell-crank lever 111 there is attached at one end a coil spring 117 the other end of which is fixed at 118 to plate 184. This spring 117 tends to draw the arm 116 to the right to cause it to rest against a stop 119. Adjacent to the point of attachment of spring 117 there is pivoted to arm 116 a pawl 120 having a pin 121 which projects through a hole 122 provided in plate 184 and engages a ratchet wheel 123 secured to the shaft 125 of the additional fare indicating device, Figs. 4 and 15. Shaft 125 is mounted in the plates 184 and 181 and projects on the outside of the latter, where it has secured to it the additional fare indicating dial 126. Rigidly mounted upon shaft 125 adjacent to ratchet wheel 123 is a second ratchet wheel 124 adapted to be engaged by a pawl 127 forming one arm of a spring actuated bell-crank lever pivoted at 128 to plate 184. The other arm 129 of this lever is held in engagement with a pin 130 projecting through a hole 131 in plate 184 and fixed to the finger 31, Fig. 5, of a lever 134. This lever 134 is secured to a rocking shaft 133 extending between and mounted in the plates 181 and 184 and projects beyond the front side of plate 181, Fig. 2 where an arm 28 is secured to it and is provided with a pin 30 at its free end, which pin is adapted to engage the cam disk 11 of adjusting shaft 1 above referred to. The left hand arm 137 of the lever 134 see Fig. 5 has a coil spring 138 attached at one end to its free end, and the other end of said spring is fixed to plate 184 and said spring tends to force down said arm. The arm 137 has also pivoted to it at 139 a spring pawl 140 which is provided with a pin 141 projecting through a hole 142 in plate 184 and engaging a ratchet wheel 143 of the uppermost adding-up mechanism 144, Fig. 4, serving to register the totals of trips made by the cab which has the taximeter attached to it.

A mechanism 145 is shown for adding up the fares indicated by the taximeter. It will be actuated by means of a spring pawl 146, Fig. 5, pivoted at 147 to arm 148 and having a pin 149 at its free end, said pin engaging a ratchet wheel 150 of said adding-up mechanism. Arm 148 is pivoted at 151 to the plate 184 and is under the influence of a spring 152 which tends to force it out of engagement with the teeth of ratchet wheel 150. Mounted on the rocking shaft 54, above referred to, is rigidly mounted an arm 153 adapted to engage the arm 148 to impart a swinging motion to it when the shaft 54 is rocked through the medium of lever 52, arm 53 and star wheel 49, Figs. 2, 5 and 17, from shaft 196 which will be driven either by the cyclometer mechanism or by the clock-work or chronometer mechanism as described above. This clock-work or chronometer mechanism is located on the left hand side of the taximeter between the plates 181 and 184, Fig. 4, and being of a well known construction need not be described in detail. The balance 154 of this clock-work is adapted to be engaged by a curved tongue 156 fixed to a lever 155 which is pivoted at 157 to plate 184 and has a projecting arm 158 adapted to engage pins 159 secured to the square frame of the adjusting shaft 1 hereinbefore described.

The device for adjusting and indicating the different tariff positions, the cash position and the free or out of service position will now be described.

Referring particularly to Fig. 8 of the drawings, the adjusting shaft 1 extends transversely across the taximeter casing 86. On one end of this shaft 1 the tariff indicating dial 161 is mounted and on the opposite end the hand wheel 171 for operating the adjusting device. Keyed to shaft 1 or otherwise rigidly connected thereto is a disk 3 which has a part of its periphery formed with a series of teeth 4 and with notches 5 and 5$^a$, see Figs. 11, 11$^a$ and 11$^b$. 6 and 7 are spring actuated pawls engaging the periphery of disk 3, the former being pivoted at 14 to a locking disk 13 secured to a sleeve 12 loosely mounted upon shaft 1 adjacent to the hand wheel 171. This sleeve has also fixed to it the flag sign 170. Adjacent to the disk 3 a cam disk 8 is rigidly secured to the adjusting shaft 1 and adjacent to this cam disk there is fixed a square frame 9 in the corners of which rollers 10 are provided. Outside of plate 181 the cam disks 11 and 95 are secured to the shaft 1 as already mentioned herebefore. The locking disk 13 see Figs. 10, 10$^a$ and 10$^b$ has several notches in its periphery, for a purpose hereinafter described. Against the periphery of locking disk 13 rests under the action of a spring the pawl 15 which will engage a notch 35 of said disk, when the taximeter is set for "Out-of-service." Between the cam disk 8 and the frame 9, which are suitably made as parts of one hub fitted on shaft 1, there is provided an annular part or collar 17 see Figs. 14, 14$^a$ and 14$^b$ the periphery of which has a stop 18. A stopping pawl 19 pivoted at 20 to the plates 181 and 184 is held by a spring in engagement with the periphery of the collar 17, said stopping pawl having a finger-shaped extension 21. An arm 23 see Figs. 2, 5 and 9 pivoted to the plates 181 and 184 is pressed by means of a spring 22 against the rollers 10 in the corners of frame 9, thereby causing the adjusting shaft 1 to positively remain in one of its four positions corresponding with the four sides of frame 9. Locking disk 13 may be engaged by a hook 24, as illustrated in Figs. 13 and 13a, said hook being pivotally mounted at 25 to plate 184, Figs. 4 and 5, and being normally held by a spring 26 within the range of locking disk 13. The pivotally mounted hook 24 is adapted to be disengaged by means of the cam wheel 11, which when being turned by means of shaft 1 will cause the arm 28 to rock owing to its pin 30 being released by said cam. In consequence finger 31 fixed to the same shaft 133 as arm 28 will be raised by a spring 138, Fig. 5, thereby forcing the lower tail end of the pivotally mounted hook 24 so as to hold the latter out of engagement with disk 13. On the other hand, when the cam surface of disk 11 engages pin 30 of arm 28 it will cause the latter to release the said end of hook 24 and thus allow it to move under the influence of spring 26 into the range of locking disk 13. Over sleeve 12 is slipped a coil spring 32, one end of which being fixed to the disk 13, the other end being attached to the casing or to the plate 86. This spring is so arranged as to constantly tend to lower the flag staff 170 which is rigidly connected by means of sleeve 12 to said locking disk 13.

The operation of the taximeter is as follows: When the taximeter is put in "free" or "out-of-service" position the flag or sign will stand up vertically in known manner and thus the spring 22 will be tight, see Fig. 2 and Figs. 10 to 12. The flag sign is prevented from turning over by the pawl 15 engaging notch 16 of locking disk 13 as shown in Fig. 10 and thus preventing the latter from being turned. At the same time arm 94, Fig. 2, is forced by its spring 97 against that part of the periphery of cam 95 having the smaller radius, the other arm 92 thus being able to engage arm 136 fixed to rocking shaft 29 and preventing it from being drawn back by the spring 187′, Fig. 5, attached to arm 187 secured also to shaft 29. In consequence roller 186 of arm 187 is held out of engagement with cam 182 so that transmission of motion from the cyclometer shaft 179 to ratchet wheel 192 and in consequence to shaft 196 is cut off and motion is imparted neither to the counting or indicating mechanism nor to the fare register, both of which depend on that shaft. In the same position of the adjusting device one of the pins 159 of square frame 9, Figs. 4 and 9, will have raised arm 158 thus forcing the spring 156 attached to the opposite arm to engage the balance 154 of the chronometer mechanism and to stop it, so as to prevent motion from being transmitted also from this mechanism to the counting or indicating mechanism and to the fare registering mechanism. That is to say, the taximeter is stopped. Now, when hand wheel 171 is turned around an angle of 90° for adjusting the "tariff 1," disk 3, cam wheel 8, collar 18, square frame 9 with corner-rolls 10 and cam 11 will follow this motion. At the same time pawl 15 will be disengaged from the notch 16 by means of a projection of cam wheel 8 striking against pin 33 of pawl 15 thus forcing the latter aside. Now the tension of spring 32 comes into action with the effect, aided by the weight of the flag, of forcing the latter down, whereby it will be indicated in a known manner that the cab is on duty. During the beginning of the turn of hand-wheel 171 pawl 7 will engage teeth 4 on the periphery of disk 3 Fig. 11 so as to prevent shaft 1 from being reversed after the turning motion has commenced. By the stopping pawl 19 see Figs. 14 to 14b with its finger-shaped upper extension 21 the hand-wheel 171 will be prevented from completing its one-fourth turn unless the flag sign is lowered. When shaft 1 is rotated and moves the collar 17, the stop 18 will strike against the edge of stopping pawl 19 sliding on collar 17 and thus prevent a further rotation. If, however, the flag turns over, it carries with it the locking disk 13, to which is fitted, as described above and illustrated in Figs. 10 to 11b, the pin 14 serving as a pivot for the locking pawl 6, the latter carrying a pin 34 projecting from the side of it. This pin will move under the finger-shaped projection 21 of stopping pawl 19 upon the locking disk 13 being turned. Thereby the stopping pawl 19 will be raised so that its lower edge will be released from stop 18 and thus the one-quarter turn of the adjusting device can be completed, Fig. 14a. This one-quarter turn will also cause the cam 95 to engage lever 94, Fig. 3, so as to push it backward against the tension of its spring. In consequence the opposite arm 92 is moved back from arm 136 thus allowing the latter to be actuated by the cyclometer mechanism above described and to impart motion to the indicating or counting dials 61, 64, 68 and to the fare register or adding-up mechanism 145 through the medium of ratchet-wheel 192, Fig. 2, shaft 193, pinion 194, wheel 195, shaft 196, star-wheel 49, Fig. 17, rocking arm 50, bell-crank lever 52, Fig. 3, pawl 56, ratchet-wheel 57, shaft 59 and rocking shaft 54, arm 153, Fig. 5, arm 148, pawl 146 and ratchet-wheel 150 respectively. At the same time pin 159 of square frame 9 will allow the lever 158 to fall down, thereby disengaging the balance 154 and thus starting the chronometer mechanism or clock-work. In consequence motion now may also be transmitted from the latter to the fare counting and adding-up mechanism through the medium of the gearing of the clock-work, toothed wheel 244, Fig. 4, pinion 42, sleeve 44, Figs. 17, 18 and 19, disk 43, pawls 45, ratchet-wheel 46, shaft 196 and so on in the manner as described above. The one-quarter turn of the adjusting shaft will be followed by the square frame 9 rigidly connected to it against the tension of spring 22 which presses the arm 23 against the rollers 10 of said frame. After completion of the one-quarter turn the bar or arm 23 will rest against the next side of frame 9.

In the position of the adjusting shaft as described just now the hand-wheel 171 is prevented from being turned back by a projection of cam wheel 8 engaging pin 33 on pawl 15, Fig. 12$^a$. Also the flag-sign can not be moved back or be turned up for, as shown in Fig. 10$^a$, the pawl 15 will again engage a notch 35 provided in the locking disk 13 whereby a return is prevented. Even if the flag should not have been entirely turned down its being turned up is impossible, for on the beginning of the down-motion of the flag the cam wheel 11 will release the pin 30 of bar 28, whereby finger 31 is moved away from the pivotally mounted hook 24, the latter being allowed to return into the range of the periphery of locking disk 13 under the action of spring 26. The notch 36 provided in the periphery of this disk 13 now will prevent the lowered flag-sign from being turned up again by its being engaged by said hook 24. After completion of the one-quarter turn the flag-sign will assume the horizontal position and the various parts of the adjusting device will be in the positions shown in Figs. 3, 10$^a$, 11$^a$ and 12$^a$. If now the hand-wheel is further turned through an angle of 90° the square frame 9 with its rollers 10 will also move a quarter of a turn until bar 23 rests against the next pair of rollers. By this further rotation the tariff indicating dial 161, Figs. 1 and 8, fitted on the front end of the adjusting shaft 1 opposite to the hand-wheel will be adjusted to "tariff 2". In this position it is locked only by the spring 22 which presses the bar 23 against square frame 9. In consequence the hand-wheel 171 can also be turned back through an angle of 90°, this being an absolutely necessary condition as the driver will often be obliged to change the taximeter from "tariff 2" to "tariff 1" when the number of persons using the cab will change. Upon turning the adjusting shaft 1 into this position that projection of cam 95 having the larger radius will engage lever 94 thus drawing the opposite arm 92 of this lever still farther back from the rocking arm so as to allow the latter to make a larger back stroke under the action of the spring 187', Fig. 5, after the roller 186 having been disengaged by the cam 182 of the cyclometer mechanism. In this position of the adjusting device, therefore, a more promotive drive will be imparted to ratchet-wheel 192 and in consequence to the fare counting or indicating mechanism and to the fare adding-up mechanism. Thus the ratio of transmission between those mechanisms and their drive will be changed according to the "tariff 2" of the taximeter now being adjusted. When on completing the trip the driver wishes to adjust the taximeter to "cash," the hand-wheel 171 will again be turned through an angle of 90°. During this motion the following operations will take place: As described above, the disk 3 will always follow the motion of the adjusting shaft 1. After the first half of this one-quarter turn of said shaft has been completed the locking pawl 6 under the influence of its spring will engage the notch 5 of said disk 3 which thereby is locked by means of locking pawl 6 and its pin 34 to locking disk 13 which is loose on shaft 1 and rigidly connected on its turn to the flag-sign. When the rotation of the hand-wheel 171 is continued the flag will follow such motion so that after completion of the latter it will be at an angle of 45°, Fig. 10$^b$, the pawl 15 simultaneously being lifted out of the notch 35 by the second projection of cam wheel 8 see Figs. 10$^b$, 11$^b$ and 12$^b$. In this position the motion of the hand-wheel 171 will be limited by the pawl 7 normally pressed by its spring against the periphery of the disk 3 and now engaging the notch 5$^a$ of this disk. The return motion of shaft 1 and in consequence a readjustment of the taximeter from "cash" position into either of the other positions is impossible owing to the pawls 6 and 7 locking the disk 3. Upon setting the taximeter to "Cash" the projection of the cam 95 will be disengaged from lever arm 94 to allow the latter to be pressed by its spring 97 against the recessed part of the said cam thus causing the opposite arm 92 to engage arm 136 and to stop its backward movement. Motion therefore will not be longer transmitted to the fare indicating and adding-up mechanisms from the cyclometer mechanism. Also the clockwork is put out of service by the second of pins 159 of frame 9 engaging lever 158 see Fig. 4 and thus stopping the balance 154 through the medium of the curved tongue 156 secured to the opposite end of said lever 158.

When the driver wants to adjust the taximeter again into "out-of-service" or "free" position he must seize the staff 170 of the flag-sign and turn it up. Owing to the clearance left in notch 5 it will be possible to turn up the staff 170 as well as the locking disk 13 and locking pawl 6 connected therewith. During this initial movement of the locking disk 13 the pawl 7 is simultaneously disengaged from notch 5ª. This is effected by the nose 37 of locking disk 13 striking against a pin 38 projecting from the side of the head end of pawl 7 and thereby forcing the latter out of the notch 5ª. The hand-wheel 17 and the shaft 1 now will follow the upward motion of the flag-sign and on completion of the movement the rear part 39 of locking pawl 6 will strike against a stop 40, whereby the other end of said pawl is lifted out of the notch 5. At the same time the pawl 15 will again engage the notch 16 of locking disk 13 thereby preventing a return motion of the latter. The adjusting device now will be again in its initial or free position shown in Figs. 2, 4, 10, 11 and 12. In this position the roller 84 mounted on disk or cam 11, Fig. 2, will have again forced outward arm 83 of lever 74 thus causing the arm 77 of this lever to move above the friction face 90, Figs. 3 and 16, of part 88 which thereby is forced down against the action of spring 91. By the downward movement of part 88 sleeve 200 supporting the gear wheels 62 and 65 and dial 64 of the fare indicating device will be shifted down its pivot 63 by means of the pins 291 engaging a groove of said sleeve. Said gear wheels now coming out of engagement with those of the neighboring dials 61 and 68 respectively the latter is allowed to return into its zero position under the influence of a spiral spring acting upon it. At the same time the dials 61 and 64 will automatically be reset to zero by means of the friction rollers 76 and 78 respectively engaging the cams 76 and 79 respectively of said dials upon the lever 74 being rocked into the position, Fig. 22, corresponding to the "free" position of the taximeter. The trip counting or adding-up mechanism 144, Fig. 4, is actuated upon each starting of the taximeter by means of the arm 28, Fig. 2, the pin 30 of which in the "free" position resting on the cam 11 and being freed from it upon the adjusting shaft being turned to the "tariff 1" position. Then spring 138, Fig. 5, attached to the arm 137 secured to the rocking shaft 133 of lever arm 28 will be allowed to force down said arm 137 and thus driving the ratchet-wheel 143 of the uppermost adding-up mechanism by means of the pawl 140 engaging said ratchet-wheel. The spindles of all adding-up mechanisms 106, 115, 145 and 143 are prevented from back motion by spring pawls engaging the ratchet-wheels of said mechanisms.

Having now particularly described and ascertained the nature of our said invention and in what manner the same is to be performed, we declare that what we claim is:

1. In a taximeter, a cyclometer mechanism, counting or indicating mechanisms engaging said cyclometer mechanism, a tariff indicating device showing different tariff positions, a cash position and a free position, an adjusting device for adjusting said tariff indicating device, a flag sign indicating by its position the free, cash and tariff positions of said tariff indicating device and being loosely mounted on and actuated by said adjusting device, means for automatically lowering said flag sign in dependency on the setting of said adjusting device into operative position and means for positively coupling the flag sign to the adjusting device when adjusting the latter to cash position.

2. In a taximeter, a cyclometer mechanism, counting or indicating mechanism engaging said cyclometer mechanism, a tariff indicating device showing different tariff positions, a cash position and a free position, an adjusting device for adjusting said tariff indicating device, a flag sign indicating by its position the free, cash and tariff positions of said tariff indicating device and being loosely mounted on and actuated by said adjusting device, means for automatically lowering said flag sign in dependency on the setting of said adjusting device into operative position, means for positively coupling the flag sign to the adjusting device when adjusting the latter to cash position and means for automatically locking said adjusting device when set to the cash position and coupled to the flag sign, said means being released when raising the flag sign into the free position.

3. In a taximeter, a cyclometer mechanism, counting or indicating mechanisms engaging said cyclometer mechanism, a tariff indicating device showing different tariff positions, a cash position and a free position, an adjusting device for adjusting said tariff indicating device, a flag sign indicating by its position the free, cash and tariff positions of said tariff indicating device and being loosely mounted on and actuated by said adjusting device, means for automatically lowering said flag sign in dependency on the setting of said adjusting device into operative position, said means comprising a sleeve fixed to said flag sign, and having secured to it one end of a spring the other end of which being fixed to the frame and means for positively coupling the flag sign to the adjusting device when adjusting the latter to cash position.

4. In a taximeter, a cyclometer mechanism, counting or indicating mechanisms engaging said cyclometer mechanism, a tariff indicating device showing different tariff positions, a cash position and a free position, an adjusting device for adjusting said tariff indicating device, a flag sign indicating by its position the free, cash and tariff positions of said tariff indicating device and being loosely mounted on and actuated by said adjusting device, means for automatically lowering said flag sign in dependency on the setting of said adjusting device into operative position, said means comprising a sleeve fixed to said flag sign and revoluble on the adjusting shaft, a coil spring surrounding said sleeve and being secured with the one end to the frame and with the other to the sleeve, said spring tending to lower said flag sign and a locking device for locking said flag sign normally in its raised position and being releasable by said adjusting device when setting the latter.

5. In a taximeter, a cyclometer mechanism, counting or indicating mechanisms engaging said cyclometer mechanism a tariff indicating device showing different tariff positions, a cash position and a free position, an adjusting device for adjusting said tariff indicating device, a flag sign indicating by its position the free, cash and tariff positions of said tariff indicating device and being loosely mounted on and actuated by said adjusting device, said adjusting device having a shaft, a hand wheel and a disk on said shaft, a recess in the periphery of said disk, a pawl adapted to engage said recess and a nose secured to said flag sign and being in the range of said pawl so as to cause the release of said pawl when the flag sign is being raised.

6. In a taximeter, a cyclometer mechanism, counting or indicating mechanisms engaging said cyclometer mechanism, a tariff indicating device showing different tariff positions, a cash position and a free position, an adjusting device for adjusting said tariff indicating device, a flag sign indicating by its position the free, cash and tariff positions of said tariff indicating device and being loosely mounted on and actuated by said adjusting device, said adjusting device having a shaft, a hand wheel and a disk on said shaft, a recess in the periphery of said disk, a pawl adapted to engage said recess, a nose secured to said flag sign and being in the range of said pawl so as to cause the release of said pawl when the flag sign is being raised, means for automatically lowering said flag sign in dependency on the setting of said adjusting device into operative position, said means comprising a sleeve fixed to said flag sign, and having secured to it one end of a spring the other end of which being fixed to the frame, said spring tending to lower said flag sign and a locking device for locking said flag sign normally in its raised position and being releasable by said adjusting device when setting the latter.

7. In a taximeter, a cyclometer mechanism, counting or indicating mechanisms engaging said cyclometer mechanism, a tariff indicating device showing different tariff positions, a cash position and a free position, an adjusting device for adjusting said tariff indicating device, a flag sign indicating by its position the free, cash and tariff positions of said tariff indicating device and being loosely mounted on and actuated by said adjusting device, said adjusting device having an adjusting shaft, a hand wheel and a disk fixed to said adjusting shaft, two recesses in the periphery of said disk, a locking pawl adapted to engage one of said recesses, means for automatically lowering said flag sign in dependency on the setting of said adjusting device into operative position, said means comprising a sleeve fixed to said flag sign and revoluble on the adjusting shaft, a coil spring surrounding said sleeve and being secured with the one end to the frame and with the other to the sleeve, said spring tending to lower said flag sign and a locking device for locking said flag sign normally in its raised position and being releasable by said adjusting device when setting the latter and a locking disk on said sleeve having pivoted to it a locking pawl adapted to engage the other one of said recesses in the disk on said adjusting shaft so as to couple said adjusting device to said flag sign.

8. In a taximeter, a cyclometer mechanism, counting or indicating mechanisms engaging said cyclometer mechanism, a tariff indicating device showing different tariff positions, a cash position and a free position, an adjusting device for adjusting said tariff indicating device, a flag sign indicating by its position the free, cash and tariff positions of said tariff indicating device and being loosely mounted on and actuated by said adjusting device, said adjusting device having an adjusting shaft, a hand wheel and a collar fixed on said shaft, a stop on said collar, a pivotally mounted stopping pawl being in the range of said stop so as to normally prevent said adjusting device to be turned and means to raise said stopping pawl out of engagement with said stop, said means being actuated by said flag sign when falling down.

9. In a taximeter, a cyclometer mechanism, counting or indicating mechanisms engaging said cyclometer mechanism, a tariff indicating device showing different tariff positions, a cash position and a free position, an adjusting device for adjusting said tariff indicating device, a flag sign indicating by its position the free, cash and tariff positions of said tariff indicating device and being loosely mounted on and actuated by said adjusting device, said adjusting device having an adjusting shaft, a hand wheel and a collar fixed on said shaft, a stop on said collar, a pivotally mounted stopping pawl being in the range of said stop so as to normally prevent said adjusting device to be turned, a finger on said stopping pawl, means for automatically lowering said flag sign in dependency on the setting of said adjusting device into operative position, said means comprising a sleeve fixed to said flag sign and revoluble on the adjusting shaft, a coil spring surrounding said sleeve and being secured with the one end to the frame and with the other to the sleeve, said spring tending to lower said flag sign and a locking device for locking said flag sign normally in its raised position and being releasable by said adjusting device when setting the latter, a locking disk on said sleeve having pivoted to it a locking pawl adapted to engage the other one of said recesses in the disk on said adjusting shaft so as to couple said adjusting device to said flag sign and a pin on said locking pawl being in the range of said finger so as to raise said stopping pawl out of engagement with said stop when striking against said finger on lowering said flag sign.

10. In a taximeter, a cyclometer mechanism, counting or indicating mechanisms engaging said cyclometer mechanism, a tariff indicating device showing different tariff positions, a cash position and a free position, an adjusting device for adjusting said tariff indicating device, a flag sign indicating by its position the free, cash and tariff positions of said tariff indicating device and being loosely mounted on and actuated by said adjusting device, said adjusting device having an adjusting shaft, a hand wheel and a disk fixed to said adjusting shaft, two recesses in the periphery of said disk, a locking pawl adapted to engage one of said recesses, a nose secured to said flag sign and being in the range of said pawl so as to cause the release of said pawl when the flag sign is being raised, means for automatically lowering said flag sign in dependency on the setting of said adjusting device into operative position, said means comprising a sleeve fixed to said flag sign and revoluble on the adjusting shaft, a coil spring surrounding said sleeve and being secured with the one end to the frame and with the other to the sleeve, said spring tending to lower said flag sign and a locking device for locking said flag sign normally in its raised position and being releasable by said adjusting device when setting the latter, a locking disk on said sleeve having a notch in its periphery and pivoted to it a locking pawl adapted to engage the other one of said recesses of the disk on said adjusting shaft so as to couple said adjusting device to said flag sign and means for preventing said flag sign from being raised again after having fallen on adjusting said adjusting device from free to the first tariff position, said means comprising a pivotally mounted hook being pressed by a spring into the range of the notch of said locking disk but normally retained from engagement by means of a lever, said lever having a finger engaging said hook and sliding with its free end on a cam fixed to said adjusting shaft, said cam being so formed as to cause said hook to be held by said spring in the range of said notch after said flag sign having been caused to fall down.

11. In a taximeter a casing having a front wall, an opposite rear wall and side walls adjacent to said front and rear walls, a view opening in two of said adjacent walls, a cyclometer mechanism, counting or indicating mechanisms engaging said cyclometer mechanism, a tariff indicating device provided with a tariff indicating dial, an adjusting device for engaging, disengaging and adjusting said tariff indicating device, fare indicating dials connected to said indicating mechanisms, said fare indicating and tariff indicating dials being so arranged as to be both visible through the view opening in the rear wall of said casing, a flag sign indicating by its position the different conditions of said tariff indicating device and being caused to automatically lower on setting said adjusting device into operative position, a hand wheel connected to said adjusting device and projecting from the front wall of said casing, adding-up mechanisms engaging said cyclometer mechanism and said counting or indicating mechanisms, said adding-up mechanisms having drums with characters thereon indicating the totals of the fares and of the distances registered by the taximeter and being so arranged as to be visible through the view opening in the side wall of said casing, means for automatically lowering said flag sign in dependency on the setting of said adjusting device into operative position, means for positively coupling the flag sign to the adjusting device when adjusting the latter to cash position and means for automatically locking said adjusting device when set to the cash position and coupled to the flag sign, said means being released when raising the flag sign into the free position.

12. In a taximeter, a cyclometer mechanism, counting or indicating mechanisms engaging said cyclometer mechanism, a tariff indicating device showing different tariff positions, a cash position and a free position, an adjusting device for adjusting said tariff indicating device, a flag sign loosely mounted on said adjusting device and being automatically lowered on the setting of the adjusting device into operative position, means for positively coupling the flag sign to said adjusting device when adjusting the latter to cash position and releasable means for automatically locking said adjusting device in said latter position.

13. In a taximeter, a cyclometer mechanism, counting or indicating mechanisms engaging said cyclometer mechanism, a tariff indicating device showing different tariff positions, a cash position and a free position, an adjusting device having a shaft, a hand wheel and a disk on said shaft, two recesses in the periphery of said disk, a flag sign loosely mounted on said adjusting device and being automatically lowered on the setting of the adjusting device into operative position, means for positively coupling the flag sign to the adjusting device when adjusting the latter to cash position, means comprising a pawl adapted to engage one of said recesses for automatically locking said adjusting device when set to the cash position and a nose secured to said flag sign and being in the range of said pawl so as to cause the release of said pawl when the flag sign is being raised.

14. In a taximeter, a cyclometer mechanism, counting or indicating mechanisms engaging said cyclometer mechanism, a tariff indicating device showing different tariff positions, a cash position and a free position, an adjusting device for adjusting said tariff indicating device, a flag sign indicating by its position the free, cash and tariff positions of said tariff indicating device and being loosely mounted on and actuated by said adjusting device, means for automatically lowering said flag sign in dependency on the setting of said adjusting device into operative position, means for positively coupling the flag sign to the adjusting device when adjusting the latter to cash position, means for automatically locking said adjusting device when set to the cash position and coupled to the flag sign, said means being released when raising the flag sign into the free position, said adjusting device having an adjusting shaft, a hand wheel and a collar fixed on said shaft, a stop on said collar, a pivotally mounted stopping pawl being in the range of said stop so as to normally prevent said adjusting device to be turned and means to raise said stopping pawl out of engagement with said stop, said means being actuated by said flag sign when falling down.

15. In a taximeter, a cyclometer mechanism, counting or indicating mechanisms engaging said cyclometer mechanism, a tariff indicating device showing different tariff positions, a cash position and a free position, an adjusting device, having a shaft, a hand wheel and a disk on said shaft, two recesses in the periphery of said disk, a flag sign loosely mounted on said adjusting device and normally locked in its raised position, means comprising a pawl adapted to engage one of said recesses for automatically locking said adjusting device when set to the cash position, a locking disk on said adjusting shaft, a locking pawl pivoted to said locking disk and adapted to engage the other one of said recesses of the disk on said adjusting shaft so as to couple said adjusting device to said flag sign and means for releasing said locking pawl.

16. In a taximeter, a cyclometer mechanism, counting or indicating mechanisms engaging said cyclometer mechanism, a tariff indicating device showing different tariff positions, a cash position and a free position, an adjusting device for adjusting said tariff indicating device, a flag sign indicating by its position the free, cash and tariff positions of said tariff indicating device and being loosely mounted on and actuated by said adjusting device, means for automatically lowering said flag sign in dependency on the setting of said adjusting device into operative position and releasable means for preventing said flag sign from being raised independently of the adjusting device.

17. In a taximeter, a cyclometer mechanism, counting or indicating mechanisms engaging said cyclometer mechanism, a tariff indicating device showing different tariff positions, a cash position and a free position, an adjusting device for adjusting said tariff indicating device, a flag sign indicating by its position the free, cash and tariff positions of said tariff indicating device and being loosely mounted on and actuated by said adjusting device, means for automatically lowering said flag sign in dependency on the setting of said adjusting device into operative position and releasable means for preventing said flag sign from being raised independently of the adjusting device, said means comprising a pivotally mounted hook normally held by a spring in the range of said locking disk and adapted to be disengaged from said locking disk by a cam wheel on said adjusting shaft.

In testimony whereof we have hereunto set our hands in presence of two subscribing witnesses.

HERMANN ARON.
OSKAR RUNGE.

Witnesses:
HENRY HASPER,
WOLDEMAR HAUPT.